Jan. 14, 1969  H. J. JACOBS  3,421,404
EXPANSION BOLT ASSEMBLY
Filed Dec. 13, 1967
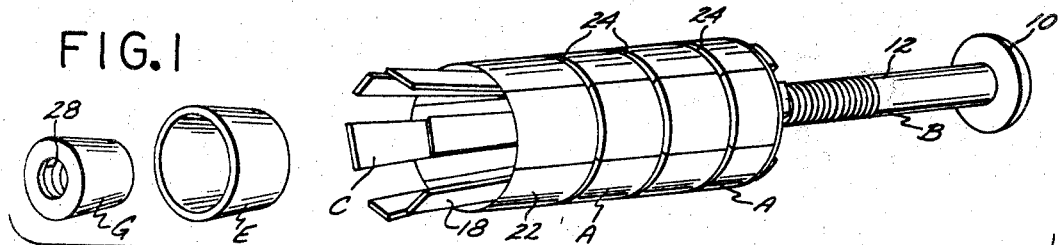
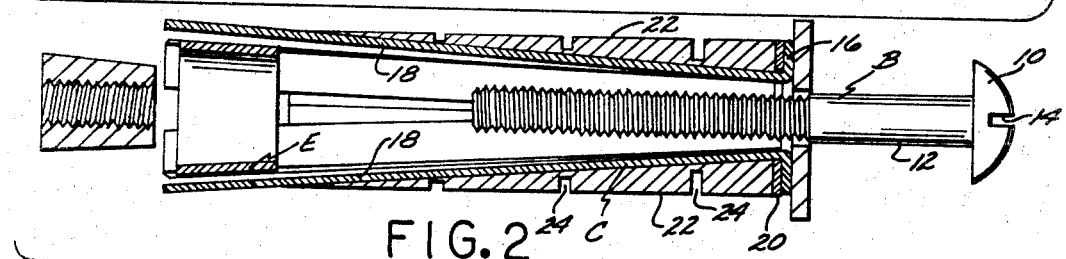
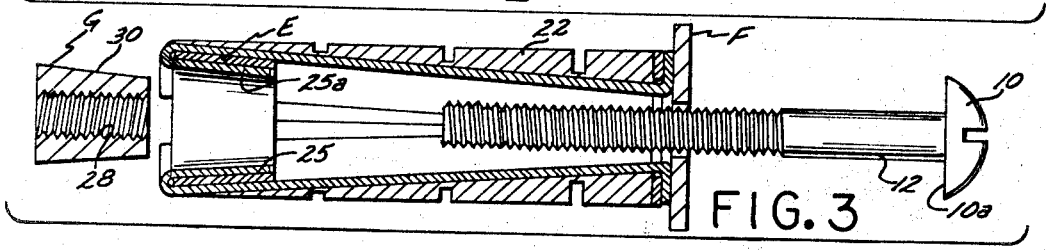
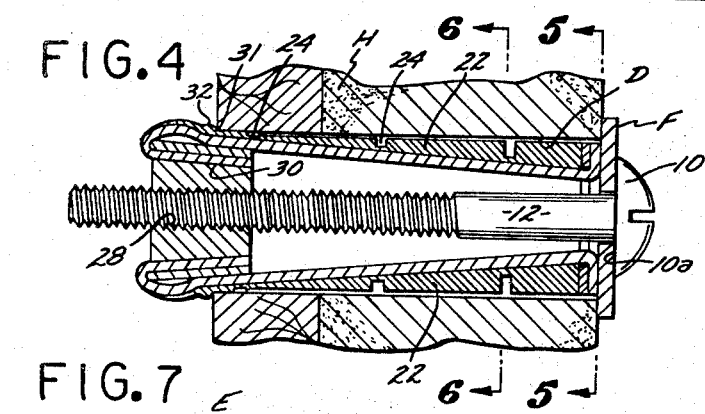
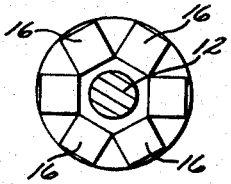
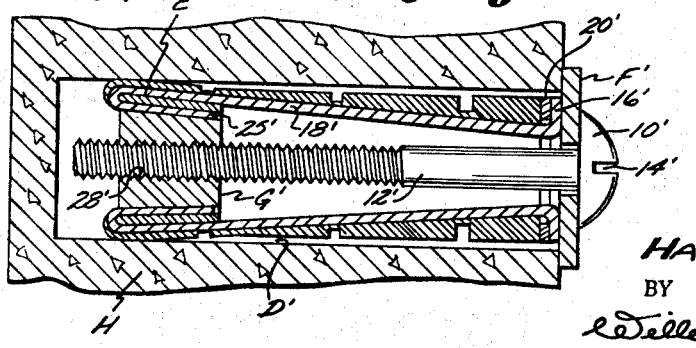
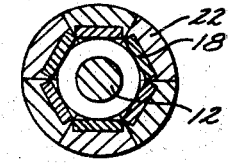
INVENTOR.
HAROLD J. JACOBS
BY
William G. Babcock
ATTORNEY

United States Patent Office 3,421,404
Patented Jan. 14, 1969

3,421,404
EXPANSION BOLT ASSEMBLY
Harold J. Jacobs, 810 W. Hamilton St.,
San Pedro, Calif. 90731
Filed Dec. 13, 1967, Ser. No. 690,192
U.S. Cl. 85—73
Int. Cl. F16b *13/06;* F16b *13/08*
3 Claims

ABSTRACT OF THE DISCLOSURE

An expansion bolt assembly that may be removably disposed in a cavity in a rigid body or a bore that extends through the body to removably lock said assembly in either said cavity or said bore and comprises a plurality of expandable fingers with a ductile metal bonded thereto, and a tapered nut and a tapered sleeve which cause expansion of the fingers upon axial movement of the tapered nut by the bolt member.

BACKGROUND OF THE INVENTION

*Field of the invention*

Expansion bolt assembly for use in either a bore or cavity formed in a rigid body.

*Description of the prior art*

Although various forms of expansion bolt assemblies have been devised in the past, such devices do not positively grip a rigid body with the effectiveness of the present invention. The present expansion bolt assembly is adapted for use in either a cavity or bore formed in a rigid body, and when mounted therein grips the body with a more positive action, than is attainable by means of prior devices of this nature.

SUMMARY OF THE INVENTION

An expansion bolt assembly in which a screw in cooperation with a tapered nut, radially expands a plurality of circumferentially spaced fingers carrying slugs of a ductile metal to removably lock the assembly in either a cavity formed in a rigid body or a bore extending through the body.

BRIEF DESCRIPTION OF THE DRAWING

FIG. 1 is an exploded perspective view of the expansion bolt assembly;

FIG. 2 is a longitudinal cross-sectional view of the assembly prior to bending of the rear portion of the fingers associated therewith being bent to define hooks that engage a tapered sleeve;

FIG. 3 is a longitudinal cross-sectional view of the assembly with the hooks in engagement with the tapered sleeve;

FIG. 4 is a longitudinal cross-sectional view of the assembly in a bore that extends through a rigid body and in gripping contact with the body;

FIGS. 5 and 6 are transverse cross-sectional views of the assembly, taken on the lines 5—5 and 6—6 respectively, of FIG. 4; and FIG. 7 is a longitudinal cross-sectional view of the expansion bolt assembly disposed in a cavity in a rigid body and in gripping engagement with the body.

DESCRIPTION OF THE PREFERRED EMBODIMENT

The expansion bolt assembly A, as can best be seen in FIGS. 1 to 3 inclusive, includes a screw B provided with a head 10 from which a threaded shank 12 projects. A traverse slot 14 is formed in head 10.

A number of elongate metallic fingers C are provided, the forward end portion of each of which is bent outwardly to define a leg 16. The fingers C are in circumferentially spaced relationship, and extend longitudinally in the same direction. The longitudinal portions 18 of the fingers C, as shown in FIG. 2, taper rearwardly and outwardly.

A first washer 20 encircles the portions 18 of legs C and is disposed adjacent to the legs 16. A slug 22 of a ductile metal such as lead is bonded to the exterior surface of portions 18, with each slug having a number of longitudinally spaced, transverse slots 24 formed in the outer portion thereof for reasons to be later explained. By a forming operation the rear parts of finger portions 18 are shaped into U-shaped hooks 25 which engage a sleeve E that tapers inwardly and forwardly as shown in FIGS. 1 to 3 inclusive.

A second washer F of greater diameter than a bore D in which the assembly A is disposed (FIG. 4) is provided, which abuts against the forward faces of leg 16. The rear face 10a of head 10 abuts against the forward face 26 of second washer F.

Shank 12 threadedly engages a tapped bore 28 in a nut G having an inwardly and forwardly tapering external face 30 that is at substantially of the same angle relative to the longitudinal axis of screw B as that of the interior surfaces 25a of the hooks 25.

The bore D extends through a wall structure H, and the bolt assembly A is sufficiently long to extend through bore D, and rearwardly there beyond as illustrated in FIG. 4. When screw B is rotated in a direction to move nut G towards head 10, the nut moves forwardly relative to sleeve E and hooks 25 to radially expand the hooks and those portions of the slugs 22 overlying the same. As the slugs 22 are so radially expanded, they move outwardly relative to the rear edge 31 of bore D resulting in the formation and circumferentially extending body shoulders 32 in the slugs 22, as shown in FIG. 4.

Radial expansion of hooks 25 causes the screw B to tend to move rearwardly in bore D, but this rearward movement is restricted due to the fact that the second washer F is forced into pressure contact with the forward face of wall H. After the assembly A has been set in the manner described, the assembly is locked in bore D by body shoulder 32 and second washer F which pressure engage the rear and forward surfaces of wall H.

The purpose of the slots 24 is to permit the slugs 22 to more easily deform with the hooks 25. It will be particularly noted as to the operation of the assembly A that when as screw B is rotated in an appropriate direction, the nut G, sleeve E and hooks 25 are drawn forwardly as a unit, whereby as the longitudinal distance between the nut G and head 10 shortens the external portions of hooks 25 can move in a radial direction only, and as they so move, the portions of the slugs 22 overlying the hooks are likewise expanded radially.

The second form A' of the expansion bolt assembly shown in FIG. 2 is of the same structure as the first form A, but is shorter in length. The second form A' is adapted to be disposed in a cavity D' in a wall H'. In FIG. 7, elements of the second form A' corresponding to like elements found in first form A are identified by the same numerals and letters but to which primes have been added. When the screw 12' is rotated in a direction to move nut G', the hooks 25' and slugs 22' are radially expanded as in the first form of the device to lock assembly A' in cavity D'.

I claim:
1. An expansion bolt assembly for attachment to a rigid body, in which an opening is forming including:
   (a) a screw comprising a head and a threaded shank, which shank is disposed in said opening;
   (b) a plurality of metal fingers longitudinally posi- tioned relative to said shank and circumferentially arranged thereabout with a first end portion of said fingers being bent to define an outwardly extending leg, with a second end portion of each of said legs being shaped to define a hook;

(c) a plurality of elongate slugs of a ductile metal bonded to the exterior surfaces of said fingers spaced rearwardly from said legs;

(d) a first washer of smaller diameter than that of said opening which engages the exterior surfaces of said legs and forward surfaces of said slugs, which first washer serves to hold said fingers and slugs together as an integral unit;

(e) a second washer of larger diameter than that of said opening, with said second washer encircling said shank and disposed between said head and legs;

(f) a forwardly and inwardly tapering sleeve which engages said hooks; and (g) a forwardly and inwardly tapering nut that slidably engages the portions of said legs disposed interiorly of said sleeve and threadedly engages the rear portion of said shank which shank when rotated in a direction to draw said nut towards said head, radially expanding at least a portion of said hooks and forcing at least a part of said slugs outwardly into gripping contact with said body, and as said shank is further rotated it causes said head to force said second washer into pressure contact with the forward face of said body.

2. An expansion bolt assembly as defined in claim 1 in which said opening is a bore extending through said body and shank, fingers and slugs to extend rearwardly of said bore, with said hooks as they expand radially subjecting said slugs to sufficient pressure that they deform outwardly around the rear extremity of said bore, and said outwardly deformed portions of said slugs with said second washer serving to lock said expansion bolt assembly in said bore.

3. An expansion bolt assembly as defined in claim 2 in which longitudinally spaced transverse slots are defined in said slugs to facilitate the radial expansion of said slugs.

References Cited

UNITED STATES PATENTS

| 1,560,095 | 11/1925 | Peirce | 85—74 |
| 1,850,768 | 3/1932 | Peirce | 85—74 |
| 1,852,297 | 4/1932 | Gelpcke | 85—70 |
| 2,028,881 | 1/1936 | Saleh | 85—67 |
| 3,091,990 | 6/1963 | McVittie | 85—67 |

FOREIGN PATENTS

| 1,240,036 | 7/1960 | France. |
| 1,339,663 | 9/1963 | France. |

MARION PARSONS, Jr., *Primary Examiner.*